United States Patent Office 3,424,645
Patented Jan. 28, 1969

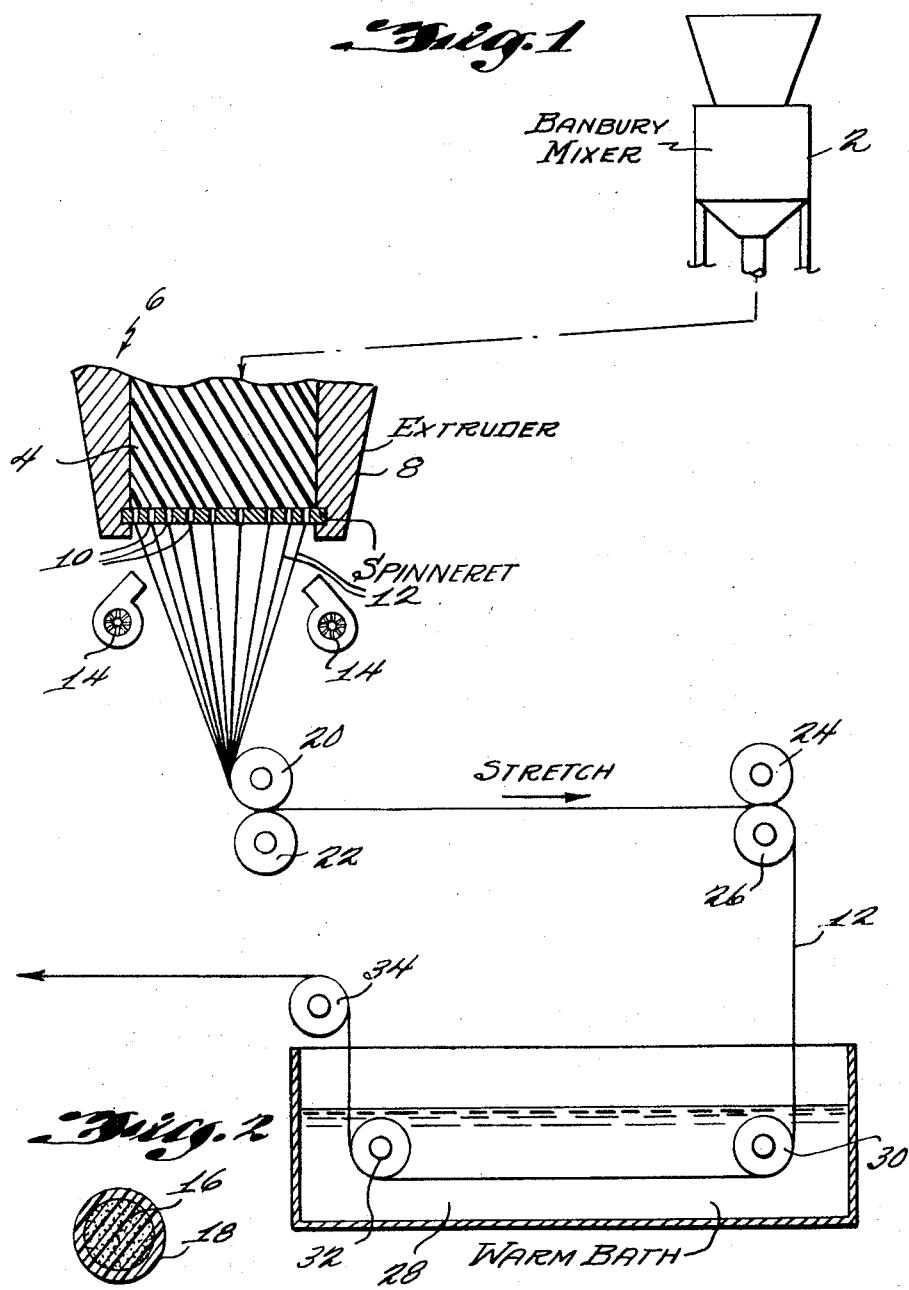

3,424,645
EXTRUDED FOAMED FIBERS
Ernest O. Ohsol, Wilmington, Del., assignor to Haveg Industries, Inc., Wilmington, Del., a corporation of Delaware
Original application Apr. 30, 1963, Ser. No. 276,708, now Patent No. 3,275,720, dated Sept. 27, 1966. Divided and this application July 30, 1964, Ser. No. 392,368
U.S. Cl. 161—175
Int. Cl. D01f *04;* D01f *02*
9 Claims

ABSTRACT OF THE DISCLOSURE

A drawn longitudinally oriented fiber of a thermoplastic resin foam is provided with a warm feel and insulating values equivalent to natural fibers, a foam resin core having elongated luminae and an impervious outer skin integrally united to said core, said core comprising 50 to 95% of the diameter of said fiber, said fiber having a density between 14 and 45 lbs./cu. ft., said resin being selected from the group consisting of styrene polymers, polyethylene, polypropylene, ethylene-propylene copolymer, polychlorotrifluoroethylene, polymethyl methacrylate, vinyl chloride polymers and polyurethanes and the drawing being to an extent of at least 2 times whereby there are highly longitudinally oriented, elongated luminae in the foamed core.

---

This application is a division of my copending application, Ser. No. 276,708, filed Apr. 30, 1963, now Patent 3,275,720.

The present invention relates to extruded foamed fibers.

When an attempt is made to prepare fibers from low density foams, e.g., polystyrene foam of a density of 5 lbs./cu. ft., unsatisfactory products are obtained because the foam does not have sufficient strength to be drawn.

Problems are also attendant upon the foaming of higher density foams in controlling the bubble size.

It is an object of the present invention to prepare novel extruded foamed fibers.

Another object is to prepare synthetic fibers having the warm feel and insulating values of natural fibers such as cotton.

A further object is to develop a novel process for preparing extruded foamed fibers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by extruding fiber of a foamed plastic having a density between 14 (or more desirably 18) and 45 lbs./cu. ft., preferably between 20 and 35 lbs./cu. ft., and drawing the fiber longitudinally to form a rather highly longitudinally oriented fiber having elongated lumina therein. For best results, it has been found that the foaming should be done in the presence of a nucleating agent in order to control the texture of the foam and give nice uniform bubbles. The surface of the fiber should be cooled rapidly prior to or simultaneously with the foaming so that there is a continuous, integral, non-porous skin on the fiber. The foamed core is at least 50% and normally from 60 to 95% of the diameter of the fiber and preferably at least 80% of the fiber diameter. The balance of the fiber diameter is the non-porous skin.

The fibers prepared according to the invention have an excellent insulating value and warm feel. They also have an advantageously high strength to weight ratio and a relatively low specific gravity compared to unfoamed fibers. They have superior moisture resistance and chemical resistance than natural fibers such as cotton, for example.

The skin, coupled with the use of relatively high density foams, supplies the extra strength necessary to draw the fiber.

The fibers are normally foamed as they come out of the extruder through the spinneret. Also, they are preferably drawn at this time. The drawing can be accomplished in either one or a plurality of steps. Also, the extruded fibers can be cooled, wound on rolls and subsequently reheated and drawn.

The amount of stretching can be from 2:1 up to 20:1 (i.e., from 200% to 2000%). Thus, there can be a longitudinal stretch of from 2:1 to 10:1, preferably between 2.5:1 and 5:1 in a first stretching step and a stretch of from 2:1 to 10:1 preferably, 2.5:1 and 5:1, in a second stretching step. Without the external skin it is not possible to satisfactorily stretch foamed plastic fibers because they will have insufficient strength at the stretching temperatures. Usually, stretching is carried out at a little below extrusion temperature. The preferred mode of operation is to stretch substantially immediately after extrusion so that the core of the fiber is warm enough to foam while the skin is cool enough to maintain the form stability of the fiber.

To avoid the problem of elastic memory, the drawing is normally done warm. Thus, for the preparing of foamed fibers used in clothing stretching should be carried out about 250° F., e.g., between 250° F. and 350° F. to prevent shrinkage in laundering. Of course, when it is desired to obtain a crimped wool-like effect, drawing is done at the lowest temperature commensurate with reasonable drawing speeds. Thus, a drawing temperature of 265–290° F. can be employed.

The foamable or foaming plastic comes out of the extruder at 5 to 50 or 100 feet/min. and drawing is accomplished, for example, by passing the fibers over two rolls rotating at different speeds.

The present invention is useful in forming foamed fibers having an integral, continuous, external skin from foamed polystyrene, foamed polyethylene of high density, e.g., 0.960, medium density, e.g., 0.935, or low density, e.g., 0.914, foamed polypropylene, foamed copolymer of ethylene and propylene, e.g., a 50:50 molar copolymer, foamed vinyl chloride polymer, e.g., polyvinyl chloride or vinyl chloride-vinyl acetate (87:13) copolymer or foamed polyurethanes. Examples of foamed polyurethanes are foams made by foaming prepolymers of polypropylene glycol 2025 molecular weight-toluene 2,4-diisocyanate, trimethylolpropane-propylene oxide adduct molecular weight 418-toluene 2,4-diisocyanate, 1,4-butanediol-adipic acid polyester-toluene 2,4-diisocyanate, glycerine-propylene oxide adduct molecular weight 1000-toluene 2,4,6-triisocyanate.

In fact, any of the conventional polyols and organic polyisocyanates can be used to form the prepolymer to form the foamed polyurethanes. Thus, there can be used any of the polyols, polyisocyanates or prepolymers disclosed in Knox Patent 3,079,641 or Friedman Patent 3,081,331 in making the polyurethanes. The entire disclosure of the Knox and Friendman patents is herein incorporated by reference.

The advantage of incorporating a phosphorus-containing polyol as one of the reactants in forming the polyurethane prepolymer is that increased flame and fire resistance is imparted to the foamed fiber. Thus, there can be used a prepolymer prepared by reacting toluene diisocyanate with a mixture of 80% polypropylene glycol molecular weight 2025 and 20% tris (dipropylene glycol) phosphite or by using a prepolymer made from toluene diisocyanate and a mixture of 75% polypropylene glycol 2025 and 25% bis (dipropylene glycol) hydroxypropoxypropane phosphonate.

When employing polystyrene, there can be used normal crystal grade polystyrene or high impact polystyrene or a mixture containing 5 to 95% normal crystal grade polystyrene and the balance high impact polystyrene. When employing a thermoplastic styrene polymer, it normally contains greater than 50% by weight of styrene and preferably at least 70% by weight of styrene in its structure, e.g., a copolymer of 70% styrene and 30% acrylonitrile. High impact polystyrenes are frequently prepared by polymerizing monomeric styrene in the presence of 2½% to 10% by weight of a rubbery diene polymer or by polymerizing styrene in the presence of such amounts of a difunctional material. Examples of high impact styrene polymers include a terpolymer of 5% acrylonitrile, 5% butadiene and 90% styrene; a copolymer of 5% butadiene and 95% styrene; the product made by polymerizing 95% of styrene in the presence of 5% polybutadiene; a copolymer of 5% chlorosulfonated polystyrene and 2.5% polybutadiene; a blend of 95% polystyrene and 5% of hydrogenated polybutadiene containing 35.4% residual unsaturation, polystyrene formed in the presence of 5% hydrogenated polybutadiene containing 4.5% of residual unsaturation; a blend of 95% polystyrene and 5% polyisoprene; and a copolymer of 99.5% styrene and 0.5% divinyl benzene.

There can also be used polymerized methyl methacrylate, polychlorotrifluoroethylene, etc.

The invention will be best understood in connection with the drawings wherein:

FIGURE 1 is a schematic illustration, partially in section, showing a preferred overall process; and FIGURE 2 is a sectional view of the foamed fiber.

Unless otherwise indicated, all parts and percentages are by weight.

EXAMPLE 1

Referring more specifically to the drawings there is provided a Banbury mixer 2. Also, there is provided a polystyrene composition made by mixing 50 parts of pellets of high impact polystyrene (Foster Grant's Tuflex 216, polystyrene modified with 5% polybutadiene) and 50 parts of pellets of regular crystal polystyrene (Koppers Dylene 8). This composition is designated hereinafter as Composition A.

90 parts of Composition A were mixed for 5 to 10 minutes in mixer 2 with 10 parts of Dow-Pelispan 101 (expansible polystyrene beads containing 6% pentane) and 0.5 part of Bayol 35 (a petroleum aliphatic hydrocarbon white oil). The mixing was carried out at room temperature. There were then added as a nucleating agent 0.75 part of powdered sodium bicarbonate and 0.6 part of powdered anhydrous citric acid and the mixture further tumbled for an additional 15 to 20 minutes. The resulting mixture 4 was then added to the extruder indicated generally at 6. The extruder includes a conventional barrel having a rotatably positioned extrusion screw therein (the barrel and screw are not shown). The polystyrene composition is heated to about 325° F. and is under a pressure of 2500 p.s.i. in the barrel. The screw forces the composition along and it is delivered at a metered rate to the spinning head 8 of the extruder. The composition is then forced through the plurality of spinnerets 10 in the die portion of the spinning head to form fibers 12. The composition is maintained at 300° F. as it emerges through the spinnerets. As the fibers emerge from the spinnerets at a rate of 30 ft./min. they are surface cooled with the aid of fans 14. These fans are disposed to insure that the outer surfaces of all the fibers are cooled. (In place of air the fibers can be cooled with water, an air-water mixture, nitrogen, argon, etc.) Thus, the fans impart to the fibers a blast of air at above room temperature, e.g., at 200° F and at 5–100 ft./min. and in the specific example being described the rate of air flow was at 25 ft./min. The outer surface of the fibers is thus cooled to below the foaming temperature, e.g., to 220° F. to form skin 16, as shown in FIGURE 2, while the inner core of the fibers is maintained above the foaming temperature, e.g., it is kept at 280° F. to form a foamed core 18. The skin formed is continuous and impervious and is integral with the foam. To be sure that there is no inadvertent foaming of the skin to produce pores the skin is cooled to at least 5° F. below the foaming temperature of the plastic. The skin, however, should not be cooled to such an extent that it is brittle in the stretching operation and, hence, the temperature of the skin should be kept above the transition temperature of the plastic, e.g., polystyrene, being foamed.

In the specific example the threads or fibers 12 as they issued from the spinnerets were 30 mils in diameter and foamed up to 40 mils diameter due to the three dimensional expansion of the fibers. The thickness of the skin was 4 mils (10% of the diameter of the fiber) and the diameter of the core was 32 mils (80% of the diameter of the fiber). (The diameter of the fiber is the diameter of the core plus twice the thickness of the skin.) The foam had a density of 30 lbs./cu. ft.

The fibers 12 then pass between rolls 20 and 22 which serve primarily to change the direction of the fibers and then pass between draw rolls 24 and 26 rotating at a speed such that the draw rate is 150 ft./min. (i.e., to give a 5:1 longitudinal stretch). The diameter of the fibers goes down to 22 mils in this stretching step. The temperature of the fiber core during this stretching is about 280° F. The stretched fibers can then be wound on a reel or they can be given a second stretch. Thus, the stretched fiber 12, which has been cooled to some extent by this time, is introduced into a warming bath 28 of glycerine at 266° F. in which are maintained direction changing pulleys 30 and 32. The fiber was in the bath long enough for both the skin and core to come to the bath temperature. After emerging from the bath the fiber 12 passes over pulley 34 and is further stretched 4:1 with the aid of a godet wheel (not shown) to produce a final fiber having a diameter of 16 mils and a density of 35 lbs./cu. ft.

The warming bath 28 can alternatively contain any other liquid inert to the thread composition. Thus, it can be an alloy such as Wood's metal. Also, instead of a hot liquid bath, the thread can be reheated for the second stretching by using a hot air oven. (By using an alloy, e.g., Wood's metal, for the bath 28 the fiber can be warmed to 290° F. prior to the second stretching, e.g., at 4:1.)

The size of the bubbles in the foamed core is quite small, and they generally are less than 2 mils diameter, e.g., 0.01 to 0.5 mil prior to the initial stretching. As stated, the stretching highly orients the fibers longitudinally, and the elongated luminae in the foamed core are similarly oriented. The skin is oriented but maintains its continuous, impervious condition. The skin has a density of about 60 lbs./cu. ft. and approximates the density of the unfoamed polystyrene.

EXAMPLE 2

In another example, using the apparatus of FIGURE 1, there was employed as the foamable composition a mixture of 100 parts of Composition A, 1 part of Celite (diatomaceous earth) having absorbed therein 1 part of pentane (i.e., 2 parts total of Celite-pentane), 0.5 part Bayol 35 and a nucleating agent composed of 0.6 part anhydrous citric acid and 0.75 part of powdered sodium bicarbonate.

The extrusion temperature was 300° F., the fibers had a diameter of 25 mils as they were spun prior to expansion, and the extruded foamed fibers had a density of 25 lbs./cu. ft., and a diameter of 38 mils, and the core 18 had a diameter of 85% the total diameter of the fibers, i.e., the skin had a thickness of 5.7 mils. The fibers were stretched 3:1 in the first step, while the core was at a temperature of 275° F. and the skin was at a temperature of 215° F. In the second step, the glycerine bath was kept at 285° F. and the second stretching was also at a 3:1 ratio.

The invention is particularly adapted to the extrusion of fibers or filaments having a diameter of 10 to 100 mils, or even up to 500 mils. If the fibers have a diameter of under 5 mils, then it is not possible to obtain a sufficiently thick skin to give strength while also having any significant diameter in the expanded core. The fibers, as they are foamed, expand in volume about 1.3 to 3.7 times and in diameter from 1.1 to 1.4 times.

In either Example 1 or Example 2 the final drawn fibers can be heated at 275° F. for ½ hour to put a partial crimp into them.

The temperature of extrusion and stretching is dependent upon the polymer of which the foamed fiber is made. The same extrusion and stretching temperatures can be used as with unfoamed fibers of the material with the precaution that the skin be formed by surface cooling of the fiber before expansion takes place.

With low density polyethylene, e.g., density of 0.915–0.920, the extrusion is carried out conveniently at 300 to 350° F. at the die orifice where the threads are formed and stretching is carried out at temperatures of 180 to 210° F. Thus, with a polyethylene of density 0.916, molecular weight 20,000, fibers were drawn 20 mils in diameter at a temperature of 320° F. and foamed to a diameter of 28 mils (the foamed core being 21 mils). The fibers having a foamed core and unfoamed, impervious, integral skin were stretched 4 times in a single stretching operation while the skin temperature was at 200° F. Slightly higher extrusion and stretching temperatures are employed with high density polyethylene, e.g., density 0.96.

Utilizing polypropylene the extrusion temperature is about 370° to 400° F. and the stretching temperature 260° to 300° F. Thus, using polypropylene melt index 0.8, it was extruded and foamed at 385° F. and the resulting fibers having a foamed core and a continuous, impervious, integral skin were stretched 3.5 in a single stretching step at a skin temperature of 281° F.

Utilizing polyvinyl chloride and polyurethanes the extrusion temperature and stretching temperatures are the same as for polystyrene.

It has been found that for best results in foaming the plastic material it should be mixed with a minor amount of an absorbent having absorbed thereon a volatile liquid which is non-reactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgus clay and activated carbon. The absorbent is usually used in an amount of 0.1–15%, preferably 0.5 to 10% by weight of the polymer. The absorbent is an inert filler of large surface area but small particle size, e.g., 200 mesh or below.

As the volatile liquid there can be used aliphatic hydrocarbons boiling between 10° and 100° C., and preferably, between 30° and 90° C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more, based on the weight of the absorbent. The amount of liquid absorbed will depend upon the capacity of the absorbent for the particular liquid. Normally, the absorbent containing the volatile liquid will appear to be a dry powder. The volatile liquid employed should be one which is non-reactive with the particular polymer employed. Usually, the amount of volatile liquid will be 0.1 to 15% by weight of the polymer, e.g., polystyrene, to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

It is also very desirable to include a nucleating agent to control the uniformity and size of the bubbles in the closed cell foam. The cell diameter normally is not over 2 mm. and, preferably, is from 0.01 to 0.5 mm. (before stretching).

When a nucleating agent is employed, it is used in an amount of from 0.02 to 10% of the total polystyrene by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonte, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid and phthalic acid. In place of the anhydrous acids or salts there can be used the solid hydrates, e.g., oxalic acid dihydrate and citric acid monohydrate.

While not essential, there can also be added a wetting agent, such as Bayol 35 (a petroleum aliphatic hydrocarbon white oil), kerosene having an average of at least 8 carbon atoms in the molecule, alkylphenoalkylene oxide adducts, e.g., Triton X–100 (t-octylphenol-ethylene oxide adduct having 10 ethylene oxide units in the molecule), sodium lauryl sulfate and sodium dodecylbenzene sulfonate. The wetting agent can be nonionic or anionic.

The foamed fibers have excellent insulating qualities, a warm feel, high strength to weight ratio and a low specific gravity. They can be used in place of cotton and have superior moisture resistance and chemical resistance to cotton. They can be employed in making clothing, seat cushions and wherever plastic fibers or natural fibers, such as cotton and wool, are employed.

What is claimed is:

1. A drawn longitudinally oriented fiber of a thermoplastic resin foam, said fiber consisting of (1) a foam resin core having elongated luminae and (2) an impervious outer skin integrally united to said core, said core comprising 50 to 95% of the diameter of said fiber, said fiber having a density between 14 and 15 lbs./cu. ft., said resin being selected from the group consisting of styrene polymers, polyethylene, polypropylene, ethylene-propylene copolymer, polychlorotrifluoroethylene, polymethyl methacrylate, vinyl chloride, polymers and polyurethanes and the drawing being to an extent of at least 2 times whereby there are highly longitudinally oriented, elongated luminae in the foamed core.

2. A fiber according to claim 1 whrein the core is 60 to 80% of the diameter of the fiber, the fiber has a density between 20 and 35 lbs./cu. ft. and has a diameter between 10 and 500 mils prior to drawing.

3. A fiber according to claim 1 wherein the fiber is made of polyethylene.

4. A fiber according to claim 1 wherein the fiber is made of polypropylene.

5. A fiber according to claim 1 wherein the fiber is made of ethylene-propylene copolymer.

6. A fiber according to claim 1 wherein the fiber is made of polyurethane.

7. A fiber according to claim 1 wherein the fiber is made of a vinyl chloride polymer.

8. A fiber according to claim 1 wherein the fiber is made of a styrene polymer.

9. A fiber according to claim 8 wherein the core is 60 to 80% of the diameter of the fiber, the fiber having a density between 20 and 35 lbs./cu. ft. and having a diameter between 10 and 500 mils prior to drawing.

References Cited

UNITED STATES PATENTS

| | | | |
|---|---|---|---|
| 2,492,425 | 12/1949 | Hall et al. | 264—54 |
| 2,893,877 | 7/1959 | Nickolls | 264—48 X |
| 3,059,251 | 10/1962 | Pollock | 161—175 |
| 2,948,048 | 8/1960 | Jankens | 161—178 |
| 3,227,664 | 1/1966 | Blades et al. | 161—178 |
| 3,069,406 | 12/1962 | Newman et al. | 161—172 |

FOREIGN PATENTS 854,586  11/1960  Great Britain.

OTHER REFERENCES

"Fibre Structure," Hearle and Peters, Butterworth and Co., Ltd., 1963, p. 149, lines 9 et seq. and p. 159, middle paragraph.

Teach, William C., and George C. Kiessling, "Polystyrene," Reinhold Publishing Corporation, New York, 1960, pp. 123–124.

ROBERT F. BURNETT, *Primary Examiner.*

J. D. FOSTER, *Assistant Examiner.*

U.S. Cl. X.R.

161—178

UNITED STATES PATENT OFFICE
CERTIFICATE OF CORRECTION

Patent No. 3,424,645                          January 28, 1969

Ernest O. Ohsol

It is certified that error appears in the above identified patent and that said Letters Patent are hereby corrected as shown below:

Column 7, line 7, "15" should read -- 45 --.

Signed and sealed this 17th day of March 1970.

(SEAL)
Attest:

Edward M. Fletcher, Jr.                    WILLIAM E. SCHUYLER, JR.

Attesting Officer                          Commissioner of Patents